(12) United States Patent
Park et al.

(10) Patent No.: US 11,657,437 B2
(45) Date of Patent: May 23, 2023

(54) METHOD AND APPARATUS FOR PROVIDING DRONE DATA BY MATCHING USER WITH PROVIDER

(71) Applicant: ANGELSWING INC., Seoul (KR)

(72) Inventors: Won Nyoung Park, Seoul (KR); Ji Sun Lee, Seoul (KR); Jun Young Jang, Suwon-si (KR); Joon Mo Yang, Seoul (KR)

(73) Assignee: ANGELSWING INC, Seoul (KR)

( * ) Notice: Subject to any disclaimer, the term of this patent is extended or adjusted under 35 U.S.C. 154(b) by 363 days.

(21) Appl. No.: 16/767,921

(22) PCT Filed: Nov. 9, 2018

(86) PCT No.: PCT/KR2018/013591
§ 371 (c)(1),
(2) Date: May 28, 2020

(87) PCT Pub. No.: WO2019/107788
PCT Pub. Date: Jun. 6, 2019

(65) Prior Publication Data
US 2020/0372555 A1  Nov. 26, 2020

(30) Foreign Application Priority Data

Nov. 29, 2017 (KR) .................... 10-2017-0161846
Nov. 29, 2017 (KR) .................... 10-2017-0161847
Nov. 29, 2017 (KR) .................... 10-2017-0161853

(51) Int. Cl.
*G06Q 30/06* (2023.01)
*G01C 21/00* (2006.01)
(Continued)

(52) U.S. Cl.
CPC ......... *G06Q 30/0605* (2013.01); *B64C 39/02* (2013.01); *G01C 21/3852* (2020.08);
(Continued)

(58) Field of Classification Search
CPC .. G06Q 30/0605; G06Q 20/085; G06Q 30/08; G06Q 10/06395; B64C 39/02; B64C 2201/123; B64C 2201/141
See application file for complete search history.

(56) References Cited

U.S. PATENT DOCUMENTS 9,418,560 B1 * 8/2016 Rosenwald .......... G05D 1/0005
10,445,836 B2 * 10/2019 Hertz ................... H04W 4/029
(Continued)

FOREIGN PATENT DOCUMENTS

AT        510729 A1 *  6/2012
JP       2003323640     11/2003
(Continued)

OTHER PUBLICATIONS

NOCUT V CBS, "Korea's First Industrial 3D Cartographic Drone "Mapper"", Youtube, Dec. 8, 2016 (https://www.youtube.com/watch?v=TGndOamOwel).
(Continued)

*Primary Examiner* — Peter D Nolan
*Assistant Examiner* — Kenneth M Dunne
(74) *Attorney, Agent, or Firm* — Perman & Green, LLP

(57) ABSTRACT

An apparatus for providing drone data provides a method of matching a user who needs drone data of a certain area with at least one provider capable of providing drone data of a part or the entirety of the certain area.

5 Claims, 17 Drawing Sheets

(51) Int. Cl.
*B64C 39/02* (2023.01)
*G06Q 20/08* (2012.01)
*G06Q 30/08* (2012.01)
*G06Q 10/06* (2023.01)
*G06Q 30/0601* (2023.01)
*G06Q 10/0639* (2023.01)
*B64U 101/30* (2023.01)

(52) U.S. Cl.
CPC ........... *G06Q 20/085* (2013.01); *G06Q 30/08* (2013.01); *B64U 2101/30* (2023.01); *B64U 2201/10* (2023.01); *G06Q 10/06395* (2013.01)

(56) References Cited

U.S. PATENT DOCUMENTS

| | | | |
|---|---|---|---|
| 2004/0039621 A1* | 2/2004 | Wood | G06Q 10/0637 |
| | | | 705/7.12 |
| 2016/0111006 A1 | 4/2016 | Srivastava et al. | |
| 2016/0306355 A1* | 10/2016 | Gordon | G08G 5/0069 |
| 2017/0177006 A1* | 6/2017 | Fisher | B64C 29/02 |
| 2017/0334559 A1* | 11/2017 | Bouffard | G05D 1/0202 |
| 2018/0033312 A1* | 2/2018 | DeLuca | G08G 5/0017 |
| 2018/0231972 A1* | 8/2018 | Woon | G05D 1/0808 |
| 2018/0349831 A1* | 12/2018 | Harris | G06Q 10/06314 |
| 2019/0066326 A1* | 2/2019 | Tran | G06T 7/0002 |
| 2019/0158597 A1* | 5/2019 | Evans | G08G 5/0026 |
| 2019/0206279 A1 | 7/2019 | Li et al. | |
| 2019/0392211 A1* | 12/2019 | Hartman | H04N 5/33 |
| 2020/0050189 A1* | 2/2020 | Gu | G05D 1/0027 |

FOREIGN PATENT DOCUMENTS

| | | |
|---|---|---|
| JP | WO2009051258 | 3/2011 |
| JP | 2014126537 | 7/2014 |
| JP | 2017156251 | 9/2017 |
| KR | 100514944 | 7/2002 |
| KR | 20020057932 | 7/2002 |
| KR | 100473959 | 2/2005 |
| KR | 100795396 | 1/2008 |
| KR | 100925278 | 11/2009 |
| KR | 20100008863 | 1/2010 |
| KR | 100940118 | 2/2010 |
| KR | 20110061213 | 6/2011 |
| KR | 101249913 | 4/2013 |
| KR | 101348797 | 1/2014 |
| KR | 101510206 | 4/2015 |
| KR | 101640189 | 7/2016 |
| KR | 20160082195 | 7/2016 |
| KR | 20160095768 | 8/2016 |
| KR | 101662071 | 10/2016 |
| KR | 20160119990 | 10/2016 |
| KR | 20170014817 | 2/2017 |
| KR | 20170048875 | 5/2017 |
| KR | 101750390 | 6/2017 |
| KR | 20170071278 | 6/2017 |
| KR | 101793509 | 11/2017 |
| KR | 101797006 | 11/2017 |
| KR | 20170123907 | 11/2017 |
| KR | 20170129073 | 11/2017 |
| WO | 2008076406 | 6/2008 |
| WO | 2015069827 | 5/2015 |
| WO | WO-2018165567 A1 * | 9/2018 |

OTHER PUBLICATIONS

International Search Report; International Application No. PCT/KR2018/013591 dated Feb. 14, 2019.
Ajami et al; "Path Planning and Ground Control Station Simulator for UAV" IEEE, 2013.
Choi et al; "Coastal Changes Detected Using Drone-Based Mapping in Hashidong Beach, Gangneung, South Korea"; Journal of the Korean Geomorphological Association; vol. 23 No. 4 (2016).

* cited by examiner

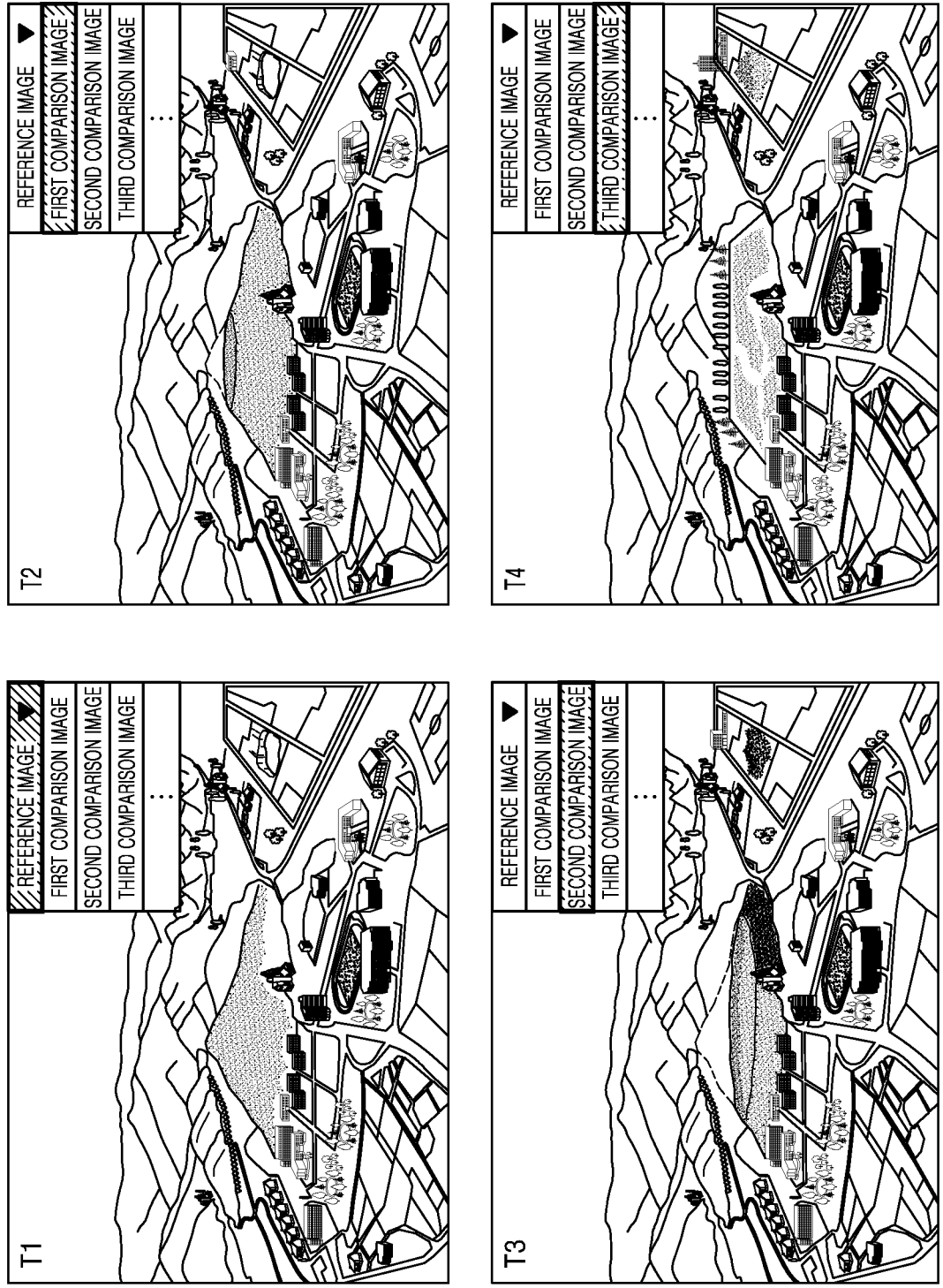

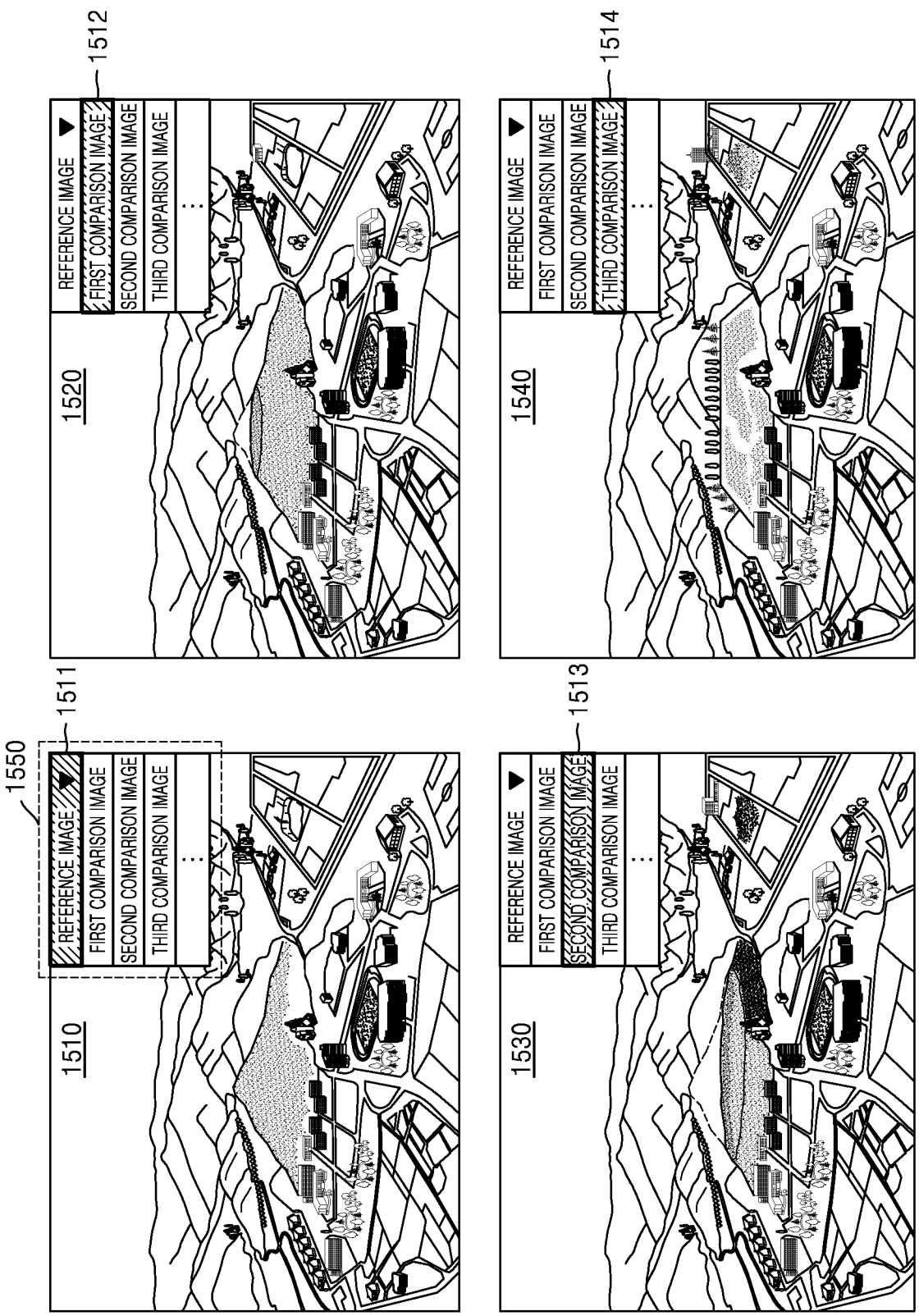

METHOD AND APPARATUS FOR PROVIDING DRONE DATA BY MATCHING USER WITH PROVIDER

CROSS REFERENCE TO RELATED APPLICATIONS

This application is a National Stage of International Application No. PCT/KR2018/013591, having an International Filing Date of 9 Nov. 2018, which designated the United States of America, and which International Application was published under PCT Article 21(2) as WO Publication No. 2019/107788 A1, which claims priority from and the benefit of Korean Patent Application No. 10-2017-0161846, filed on 29 Nov. 2017, Korean Patent Application No. 10-2017-0161847, filed on 29 Nov. 2017, and Korean Patent Application No. 10-2017-0161853, the disclosures of which are incorporated herein by reference in their entireties.

BACKGROUND

1. Field

The present disclosure relates to a platform for matching a user requesting drone data with a provider capable of providing drone data.

2. Brief Description of Related Developments

Aerial images, etc. may be used to check the progress of construction at a construction site, but there is a problem in that it is difficult to use images in real time, for a certain period, or at a point in time to check the progress.

In addition, there is a problem in that it is difficult to secure a necessary image even when it is necessary to check the progress by quickly securing an image of an area where a forest fire, fire, or disaster occurs.

SUMMARY

Provided is an apparatus for providing drone data for connecting a plurality of providers capable of providing drone images when a user desires to check a drone image for a certain area, or when a drone image for a certain area is needed in real time, on a periodic basis, or at a certain point in time.

Provided is a method of providing a drone image with guaranteed quality by checking whether a plurality of drone images, which are provided by a plurality of drone providers through an apparatus that matches a user with a provider and provides drone data, meet the requirements of a drone image requested by a user, and of conveniently providing a drone image for a certain area desired by a user by integrating a plurality of drone images provided by a plurality of drone providers into one image.

According to an aspect of the present disclosure, a method of providing drone data by matching a user with a provider includes: providing the user with an interface for designating a desired area on a map; setting at least one flight path within a designated area; providing at least one provider with an interface for selecting the at least one flight path; receiving, from the at least one provider, drone data obtained by taking aerial images on a flight path selected by each of the at least one provider; and collecting the drone data received from the at least one provider and producing an integrated drone data map for the designated area.

The producing the integrated drone data map may include: checking whether an image of the drone data collected from the at least one provider for each flight path satisfies a criterion suitable for providing to the user and further checking whether the collected drone data meets the user's requirements, to thereby provide compensation to the provider when the image of the drone data satisfies the criterion and the collected drone data meets the user's requirements.

The method may further include: charging the user a fee for the integrated drone data map produced for the designated area.

According to another aspect of the present disclosure, an apparatus for providing drone data by matching a user with a provider includes: a user interface portion that supports an interface in which a user designates a desired area on a map; a flight path setting portion that divides an area designated by the user into n zones (where n is a natural number); a provider interface that supports an interface for selecting at least one of the n zones after checking the user's requirements set for each zone; a drone data receiver that receives, from each of at least one provider, drone data obtained by shooting at least one zone selected by the at least one provider; an integrated drone data map maker that integrates the received drone data to produce an integrated drone data map for the area designated by the user; a provider compensator that checks whether the drone data received from each of the at least one provider meets the user's requirements, and then provides compensation to the at least one provider that provides drone data meeting the user's requirements; and a payment portion that provides the integrated drone data map to the user and requests payment.

The provider interface may receive, from the at least one provider, a flying time of a drone the at least one provider owns, a flying distance of the drone, and at least one of an angle of view, a pixel, and an altitude of an image shooting device used in the drone, and may selectively activate zones capable of meeting the user's requirements, based on information received from the at least one provider, and provide the selectively activated zones to the at least one provider, wherein the at least one provider may select at least one of the selectively activated zones.

The user may set at least one desired area on the map by using the user interface portion and may set a date, at which drone image is to be taken, and a resolution.

In the present disclosure, when drone data is needed for a certain area at a construction site, a local government, an emergency disaster response center, etc., drone data in the certain area may be requested in real time.

In the present disclosure, it is possible to provide high-quality drone data to a user by transmitting the user's requirements to a drone user and using only drone data matching the user's request.

In the present disclosure, by providing an interface for selecting a flight path or area that may be selected by providers according to the types of drones held by the providers supplying drone data and the types of image shooting devices used by drones, there is an effect of supporting providers to provide drone data that may meet a user's requirements.

In the present disclosure, it is possible to check whether drone data, which is provided by a plurality of providers through an apparatus for providing drone data by matching a user with a provider, meets a user's requirements, select only the drone data that meets the user's requirements, and generate a single integrated drone data map by integrating the drone data provided by the plurality of providers and provide the integrated drone data map to the user.

In the present disclosure, there is an effect in which an apparatus for providing drone data by matching a user with a provider provides a system capable of receiving a cost from a user who desires to purchase drone data and of paying compensation to providers who supply drone data.

BRIEF DESCRIPTION OF DRAWINGS

FIG. 7 is an exemplary aspect of the present disclosure and shows an example of providing a user with drone data for each shooting date requested by the user;

FIGS. 11 to 15 are exemplary aspects of the present disclosure and show examples of a representation method in a terrain change amount visualization device.

According to an exemplary aspect of the present disclosure, a method of providing drone data by matching a user with a provider includes: providing the user with an interface for designating a desired area on a map; setting at least one flight path within a designated area; providing at least one provider with an interface for selecting the at least one flight path; receiving, from the at least one provider, drone data obtained by taking aerial images on a flight path selected by each of the at least one provider; and collecting the drone data received from the at least one provider and producing an integrated drone data map for the designated area.

DETAILED DESCRIPTION

Hereinafter, aspects of the present disclosure will be described with reference to the drawings.

Figure 1:
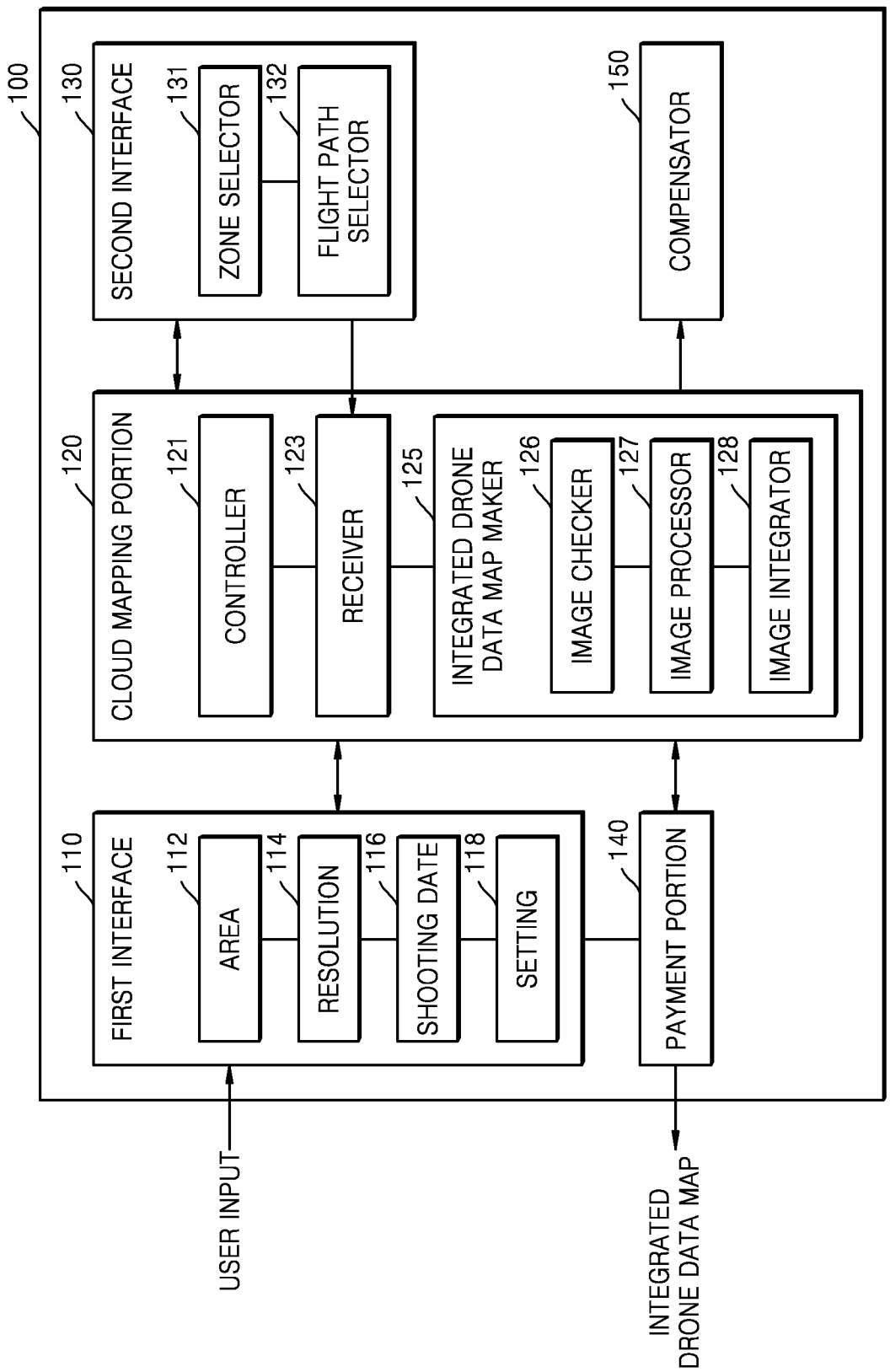
FIG. 1 is an exemplary aspect of the present disclosure and shows an internal configuration diagram of an apparatus for providing drone data by matching a user with a provider.

FIG. 1 is an exemplary aspect of the present disclosure and shows an internal configuration diagram of an apparatus 100 for providing drone data by matching a user with a provider.

In the exemplary aspect of the present disclosure, the apparatus 100 for providing drone data has a function of matching a user who needs drone data of a certain area with at least one provider capable of supplying some or all of the drone data of the certain area.

In more detail, the apparatus 100 for providing drone data receives a user's requirement when there is a user in need of drone data for a certain area in real time, at regular intervals, for a period of time, or on a certain date. In addition, the apparatus 100 for providing drone data may collect providers capable of shooting a certain area requested by a user according to a user's request and supplying drone data and may provide drone data requested by the user. The user's requirements include a shooting area, resolution, altitude (or height) at which images are taken, an image shooting period, the type of images, and the like.

The apparatus 100 for providing drone data checks whether each drone data provided by at least one provider is suitable for a user's requirements through an image checking portion 126, and selectively collects and processes drone data suitable for the user's requirements to provide drone data for a certain area required by the user.

The apparatus 100 for providing drone data may also review in advance the specifications of drones owned by providers wishing to supply drone data, check in advance whether the specifications of the drones include a specification that meets the user's requirements, and then provide a flight path to the providers, and thus, may receive highly reliable drone data from the providers.

As an exemplary aspect of the present disclosure, the apparatus 100 for providing drone data may receive a fee through a payment portion 140 in exchange for providing drone data to a user, and may pay compensation to a provider through a compensator 150 in exchange for providing the drone data.

Hereinafter, an internal configuration of the apparatus 100 for providing drone data will be described.

The apparatus 100 for providing drone data includes a first interface 110, a cloud mapping portion 120, a second interface 130, the payment portion 140, and the compensator 150.

The first interface 110 and the payment portion 140 are used for an interface with a user, and the second interface 130 and the compensator 150 are used for an interface with a provider. The cloud mapping portion 120 performs a function of matching a user with a provider.

The first interface 110 is implemented to receive input from a user requesting drone data. The first interface 110 may include an area interface 112 for setting an area in which drone data is required, a resolution interface 114 for setting the resolution of drone data, a shooting date interface 116 for setting the shooting date of drone data, and a setting interface 118 for settings related to drone data. A user may set a desired area, a desired resolution, a desired shooting date, and the user's requirements through the first interface 110.

The cloud mapping portion 120 includes a controller 121, a receiver 123, and an integrated drone data map maker 125. The integrated drone data map maker 125 includes an image checker 126, an image processor 127, and an image integrator 129.

As an exemplary aspect of the present disclosure, the cloud mapping portion 120 receives a user's requirements. Then, the cloud mapping portion 120 checks whether each drone data transmitted by at least one drone provider is drone data that meets the user's requirements, and then integrates drone data, which meets the user's requirements, to make an integrated drone data map.

Figure 2:
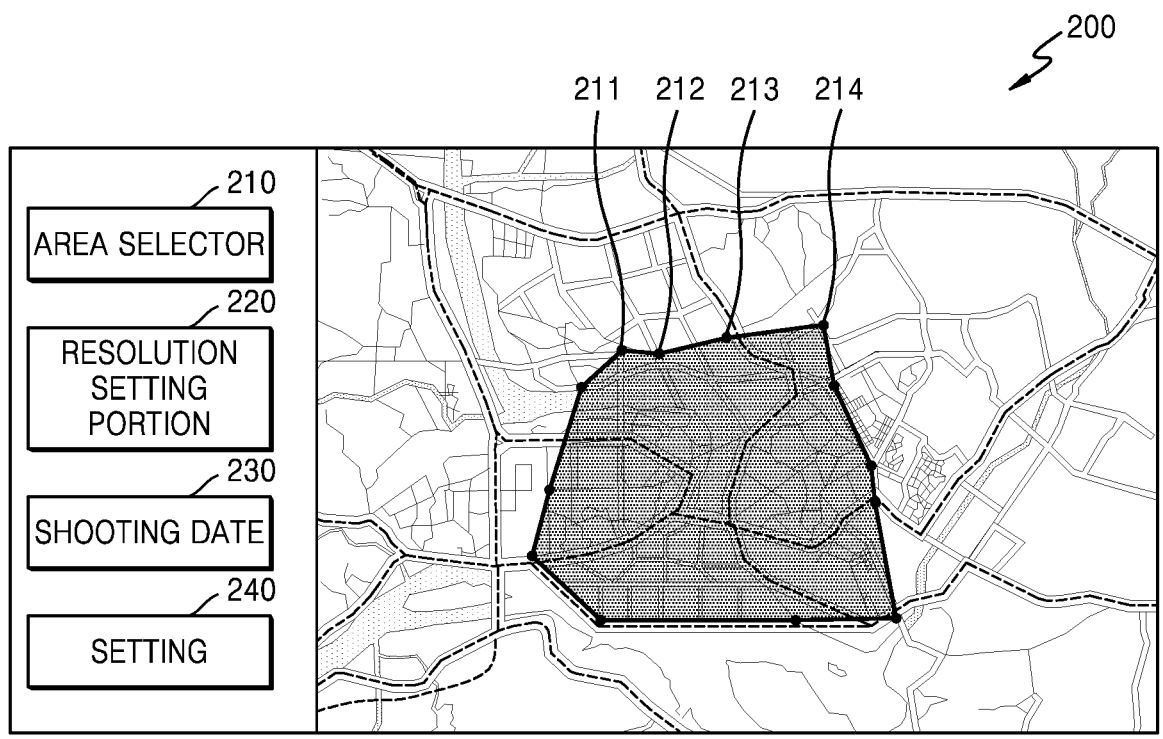
FIG. 2 is an exemplary aspect of the present disclosure and shows an example in which a user sets an area to view drone data on a map.

As an exemplary aspect of the present disclosure, the receiver 123 of the cloud mapping portion 120 receives a user's requirements, such as a desired area, a desired resolution, a desired shooting date, a shooting interval, and a shooting altitude, through a first interface 200 as shown in FIG. 2. A user may directly designate a desired area 211, 212, 213, or 214 on a map by using a stylus, a mouse, hands, or the like.

When the cloud mapping portion 120 receives a user's input, the controller 121 may check an area input by the user and the user's requirements. In addition, based on a determination result, the controller 121 may divide the area input by the user into at least one zone and provide the at least one zone to a provider screen, as shown in an example of FIG. 3, or may divide the area input by the user into at least one flight path and provide the at least one flight path to the provider screen, as shown in an example of FIG. 4.

For example, the controller 121 may divide the area input by the user into smaller zones considering a travel distance of a drone in the case where the area input by the user is an area where high resolution is desired by the user, and may divide the area input by the user into larger zones in the case where the area input by the user is an area where low resolution is desired by the user.

As another aspect the controller 121 may variously modify and set the flight path when it is desired to keep a longitudinal and lateral overlap constant or according to the requirements of another user, as in an aspect of FIG. 6.

The integrated drone data map maker 125 of the cloud mapping portion 120 integrates drone data provided by at least one provider and makes an integrated drone data map. The image checker 126 of the integrated drone data map maker 125 checks whether each of at least one piece of drone data received by the receiver 123 meets the user's requirements, for example, resolution, shooting interval, longitudinal and lateral overlap, altitude, and the like, and performs image processing required to generate a map, in the image processor 127, with respect to drone data that meets the user's requirements. Thereafter, the image integrator 128 collects each drone data to generate an integrated drone data map indicating an area requested by the user.

Figure 3A:
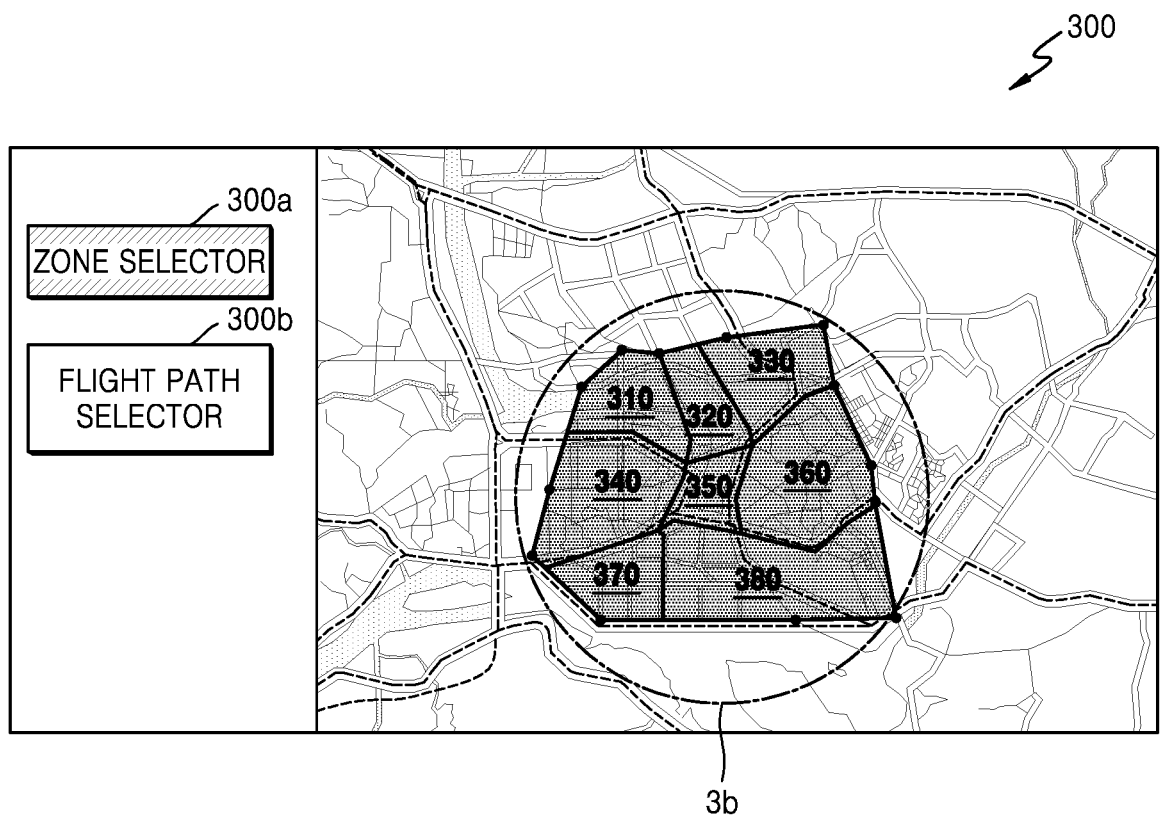
FIGS. 3A to 5 are exemplary aspects of the present disclosure and show examples in which a provider selects a flight path or zone to provide drone data.
Figure 3B:
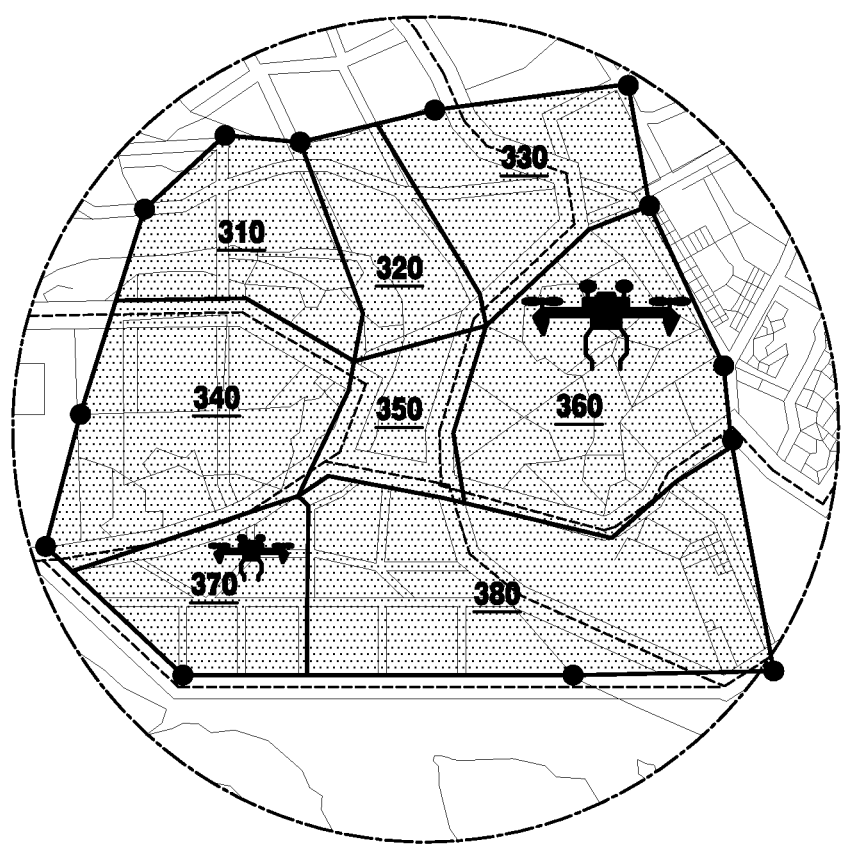
Figure 4:
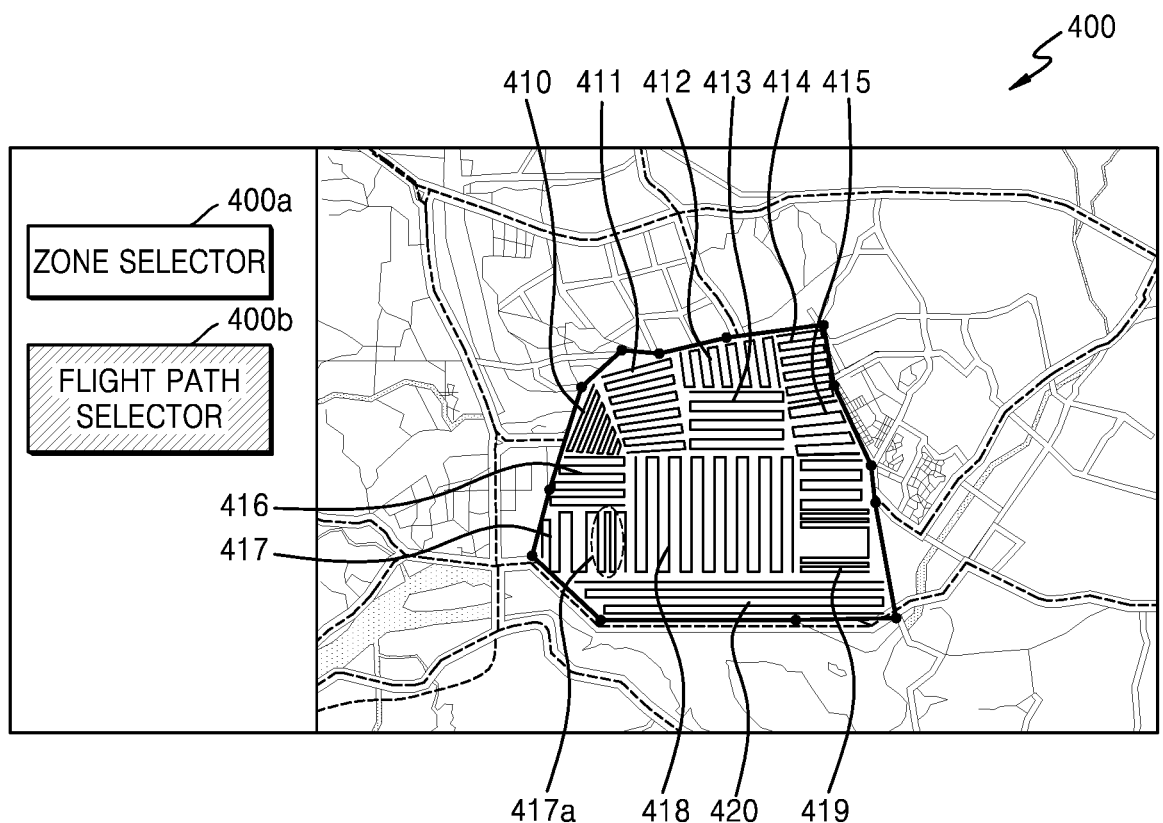
Figure 5:
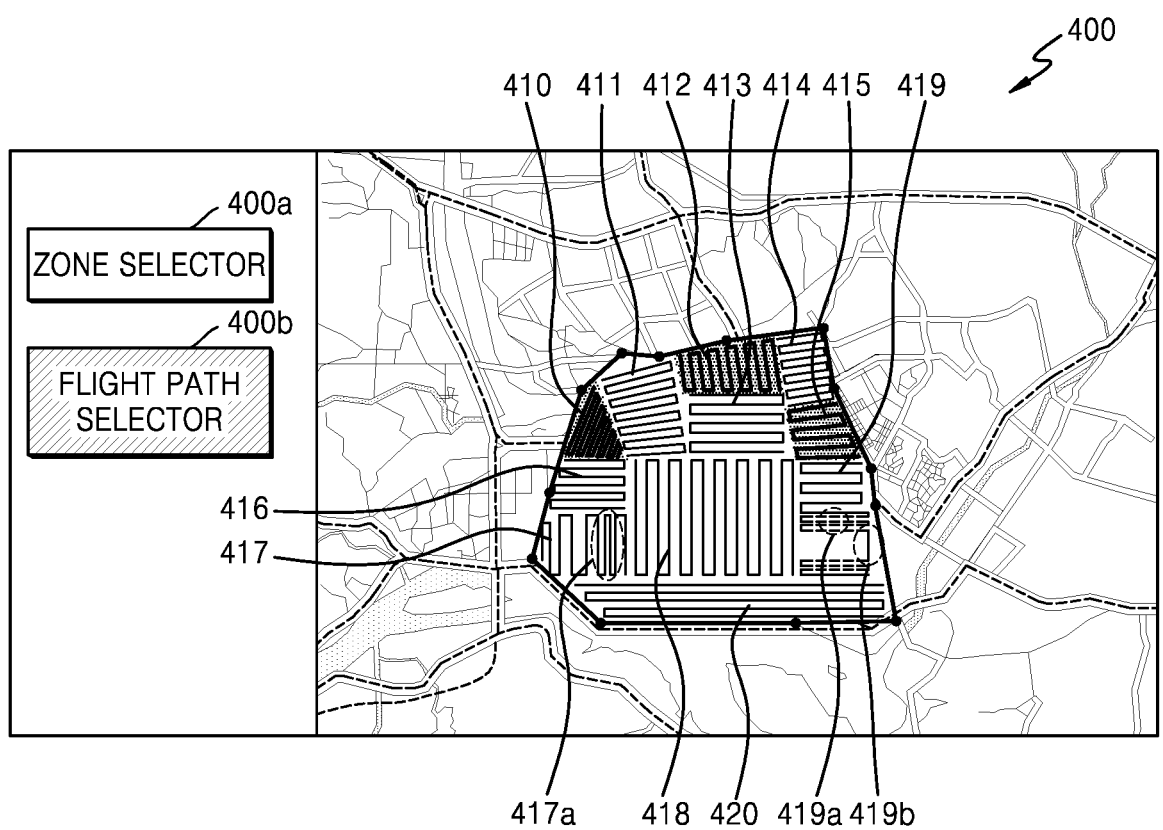

The second interface 130 is an interface used by providers, and when a user inputs a user's requirements through the first interface 110 as shown in FIG. 2, a screen for the second interface 130 as shown in FIGS. 3 to 5 is shown to the providers.

As an exemplary aspect of the present disclosure, referring to FIG. 3, when a provider activates a zone selector 300a of a second interface, an area designated by a user is divided into zones 310, 320, 330, 340, 350, 360, 370, and 380.

In this case, all of the zones 310, 320, 330, 340, 350, 360, 370, and 380 may be displayed, or only a zone, in which a drone that is owned or may be used by a provider may operate, may be activated and displayed.

The provider may select at least one of the zones 310, 320, 330, 340, 350, 360, 370, and 380 by considering an area where the provider is located, an area where the provider is movable, an area where a drone the provider owns may fly, a resolution that may be provided by a drone the provider owns, and the like. The provider acquires drone data by floating a drone in a zone selected by the provider, and then transmits the drone data to the cloud mapping portion 120 (see FIG. 1).

In this case, the drone may include a flight body capable of flying, an image shooting device mounted on the flight body to shoot the surroundings, a communication module mounted on the flight body, and a transmitter that controls a flight operation of the flight body and transmits, through the communication module, an image taken by the image shooting device.

As an exemplary aspect of the present disclosure, FIG. 4 shows a case in which a provider activates a flight path selector 400b of the second interface. The provider may select at least one of flight paths 410, 411, 412, 413, 414, 415, 416, 417, 418, 419, and 420 by considering an area where the provider is located, an area where the provider is movable, an area where a drone the provider owns may fly, a resolution that may be provided by a drone the provider owns, and the like. The provider may acquire drone data by floating a drone on at least one flight path selected by the provider.

In this case, the flight path includes coordinate values of the flight path as flight data provided by the controller 121 (see FIG. 1) of the cloud mapping portion 120 (see FIG. 1). The provider may secure drone data by operating the drone along a selected flight path without any adjustment. It should be noted that the provider may select a flight path including flight path coordinate values. However, the present disclosure is not limited thereto, and it may be assumed that the provider creates a flight path.

As another exemplary aspect of the present disclosure, referring to an embodiment of FIG. 5, when the provider inputs a flying time of a drone the provider owns, a flying distance of the drone, and at least one of an angle of view, a pixel, and an altitude of an image shooting device used in the drone, the controller 121 (see FIG.) may activate and display only flight paths (e.g., the flight paths 410, 412, and 415 in FIG. 5) on which a drone the provider owns may operate.

In another aspect of the present disclosure, although not shown in the drawings, the controller may examine requirements requested by a user for each flight path, and then may display, on a second interface screen 400, the requirements of a drone for operating along a corresponding flight path, and the requirements of an image shooting device used in the drone. Examples of the requirements of a drone include one time-flight distance of the drone and a time for which the drone is flyable with a battery mounted on the drone. Examples of the requirements of the image shooting device used in the drone include altitude, resolution, angle of view, and pixels. The provider may refer to the requirements of the drone and the requirements of the image shooting device when selecting a flight path.

In another aspect of the present disclosure, although not shown in the drawings, the controller may also examine requirements requested by a user for each zone, and then may display, on the second interface screen 400, the requirements of a drone for operating in a corresponding zone, and the requirements of an image shooting device used in the drone.

As an exemplary aspect of the present disclosure, the payment portion 140 may make an estimate based on the amount of drone data requested by a user, the quality of the drone data, the request cycle of the drone data, and the like and request payment from the user. Similarly, the compensator 150 may pay compensation based on the amount of drone data provided by the provider, the quality of the drone data, the cycle of provision of the drone data, and the like.

Figure 6A:
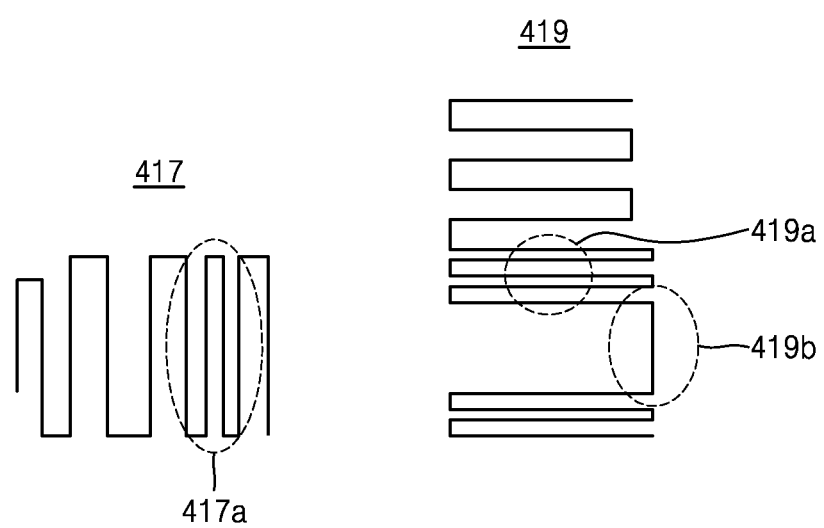
FIGS. 6A to 6B are exemplary aspects of the present disclosure and show examples of setting a flight path based on a user's requirements.
Figure 6B:
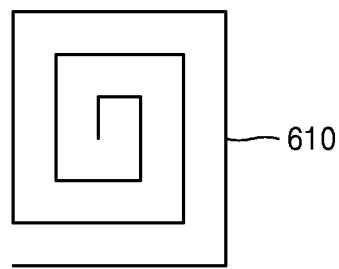

FIGS. 6A to 6B are exemplary aspects of the present disclosure and show examples of setting a flight path based on a user's requirements.

As an exemplary aspect of the present disclosure, an apparatus for providing drone data by matching a user with a provider may present flight paths as shown in FIGS. 4 to 6 to providers.

A controller of the apparatus for providing drone data by matching a user with a provider may set a flight interval of a flight path, the shape of the flight path, and the like differently according to a user's requirements, as shown in FIGS. 6A to 6B.

As an aspect of the present disclosure, the flight interval may be set to be narrow (see areas 417a and 419a in FIG. 6A) in an area where high-resolution drone data is required by a user, and the flight interval may be set to be wide (see an area 419b in FIG. 6A) in an area where low-resolution drone data is required by the user.

As an aspect of the present disclosure, a user may set a flight path differently according to an area where high altitude drone data is required by the user and an area where low altitude drone data is required by the user. As another aspect of the present disclosure, in a certain area, various types of flight paths may be set as shown in a form 610 in FIG. 6B.

FIG. 7 is an exemplary aspect of the present disclosure and shows an example of providing a user with drone data for each shooting date requested by the user.

FIG. 7 shows an example of providing an integrated drone data map collected at times t1, t2, t3, and t4 for an area designated by a user. As an exemplary aspect of the present disclosure, the apparatus for providing drone data by matching a user with a provider may provide, as drone data, information about a change in a terrain and information about the amount of change in the volume of the terrain, in addition to images taken by a drone, as shown in FIG. 7.

In an exemplary aspect of the present disclosure, global positioning system (GPS) coordinates may be mapped between images taken at different times, and in this case, reference points of the images taken at different times may be mapped based on the same feature point detected in both images. Thereafter, a digital surface model (DSM) of an image taken at a first time is compared with a DSM of an image taken at a second time to detect a change, and the volume of an area where the change has occurred is calculated. The volume is calculated by integrating a difference in altitude based on a DSM for the surface of the area where the change has occurred.

As an exemplary aspect of the present disclosure, the apparatus for providing drone data by matching a user with a provider may check the amount of change in a terrain during a period desired by a user, as in an example shown in FIG. 7. In addition, in the event of a forest fire, fire, disaster, etc., the apparatus for providing drone data by matching a user with a provider may receive drone data in real time from drone users adjacent to a corresponding area and provide an integrated drone data map.

Figure 8:
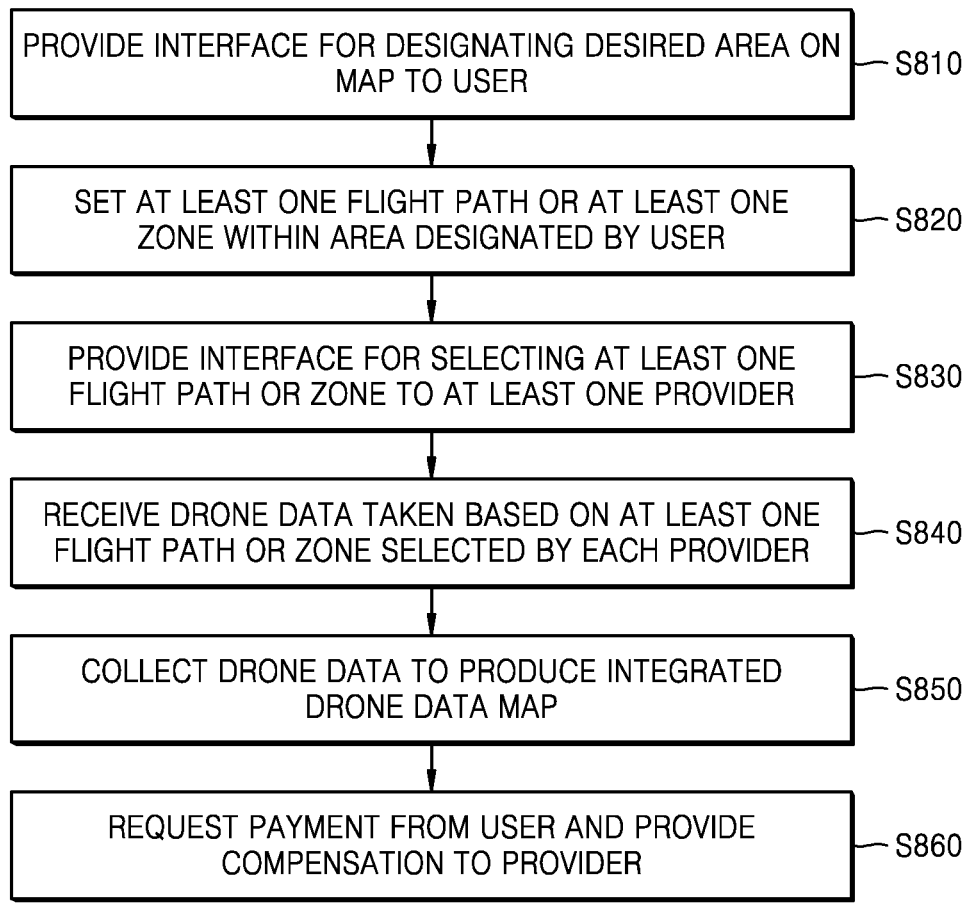
FIG. 8 is an exemplary aspect of the present disclosure and shows a flowchart of a method of providing drone data by matching a user with a provider.

FIG. 8 is an exemplary aspect of the present disclosure and shows a flowchart of a method of providing drone data by matching a user with a provider.

The apparatus for providing drone data by matching a user with a provider provides an interface for designating a desired area on a map to the user (operation S810). The interface is implemented to receive information such as area, resolution, altitude, shooting date, and shooting interval from the user.

When the controller receives a requirement and a designated area from the user, the controller sets at least one flight path or at least one zone within an area designated by the user, with reference to the requirement and designated area received from the user (operation S820).

The controller provides an interface for selecting the at least one flight path or zone to at least one provider (operation S830), and receives, from each provider, drone data taken based on at least one flight path or zone selected by each provider (operation S840). The integrated drone data map maker may collect drone data to produce an integrated drone data map (operation S850), provide the produced integrated drone data map to the user and request payment (operation S860), and provide compensation to the provider (operation S860).

Figure 9:
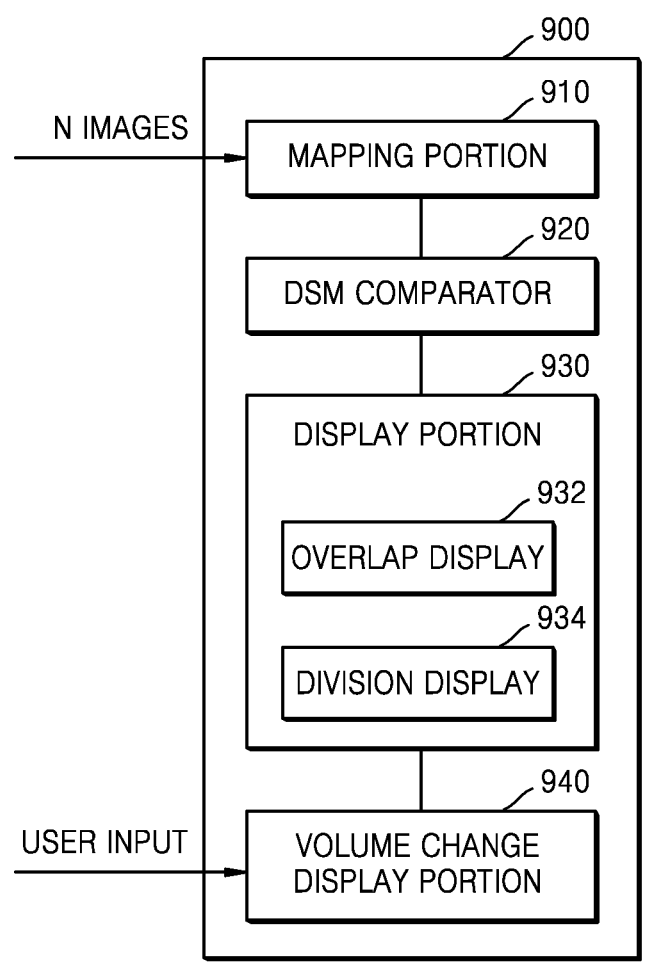
FIG. 9 is an exemplary aspect of the present disclosure and shows an internal configuration of a terrain change amount visualization device.

As an exemplary aspect of the present disclosure, FIG. 9 shows an internal configuration of a terrain change amount visualization device 900.

The terrain change amount visualization device 900 may include a mapping portion 910, a DSM comparator 920, and a change display portion 930, and may further include a volume change display portion 940.

The mapping portion 910 maps a reference image taken using a drone in a certain area to a comparison image taken using a drone in the certain area at a different time. As an exemplary embodiment of the present disclosure, the mapping portion 910 may perform coordinate matching for an image by using a ground control point (GCP) acquired through a global navigation satellite system (GNSS) survey.

As an exemplary aspect of the present disclosure, the drone may include a flight body capable of flying, an image shooting device mounted on the flight body to shoot the surroundings, a communication module mounted on the flight body, and a transmitter that controls a flight operation of the flight body and transmits, through the communication module, an image taken by the image shooting device.

The mapping portion 910 maps GPS coordinate information of feature points extracted from a reference image taken at time t1 to GPS coordinate information of corresponding ones of feature points extracted from a comparison image taken at time t2, t3, t4, and tn.

In an exemplary aspect of the present disclosure, the reference image and the comparison image may be taken in an area requested by a user, and may be generated by integrating images taken using at least one drone. In addition, the resolution of the reference image and the resolution of the comparison image may be changed differently according to a user's request. In addition, a shooting time, a shooting interval, and a shooting date for taking the reference image and the comparison image may be changed differently according to a user's request.

After GPS coordinates are mapped between the reference image and at least one comparison image, the DSM comparator 920 compares a DSM of the reference image with a DSM of the comparison image to derive the amount of change between the reference image and the comparison image. In an exemplary aspect of the present disclosure, an example of comparing altitudes of DSMs is disclosed, but contour information and the like may be used in addition to the DSMs.

Figure 10:
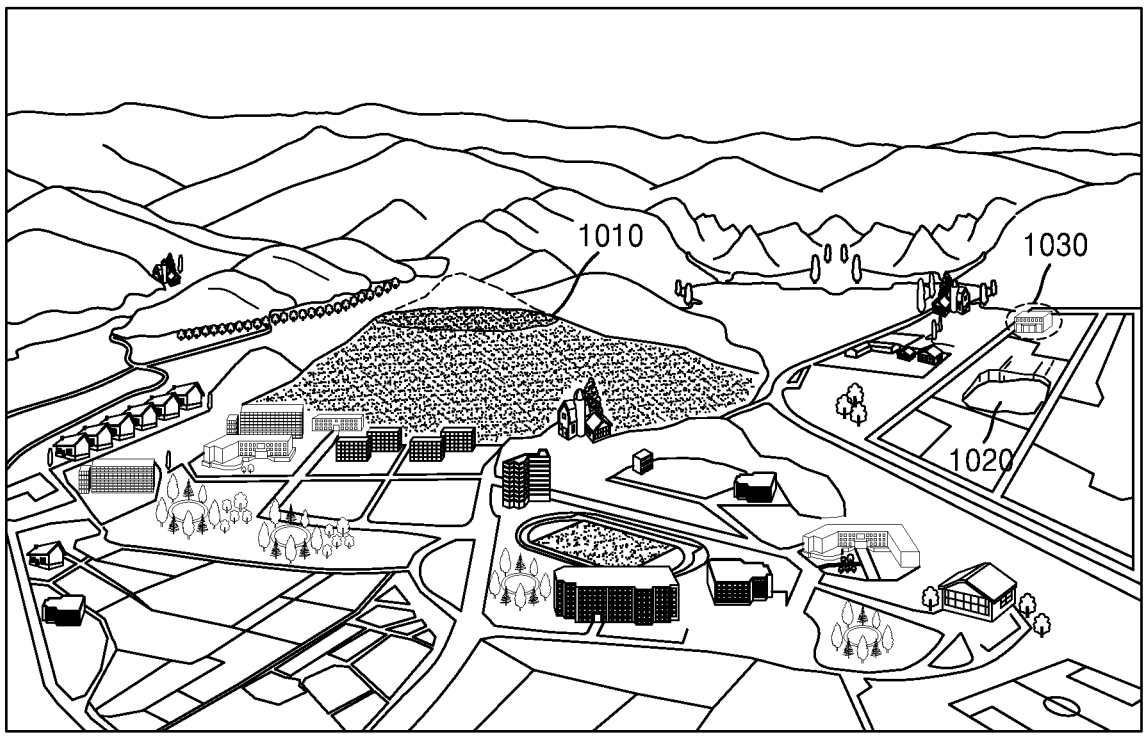
FIG. 10 is an exemplary aspect of the present disclosure and shows an area exceeding a reference line and an area not exceeding the reference line in a terrain change amount visualization device.

As an exemplary aspect of the present disclosure, the DSM comparator 920 may display, as in FIG. 10, changes 1010, 1020, and 1030 between a reference image 700 shown in FIG. 7 and a first comparison image 710 taken at time t2.

Figure 11:
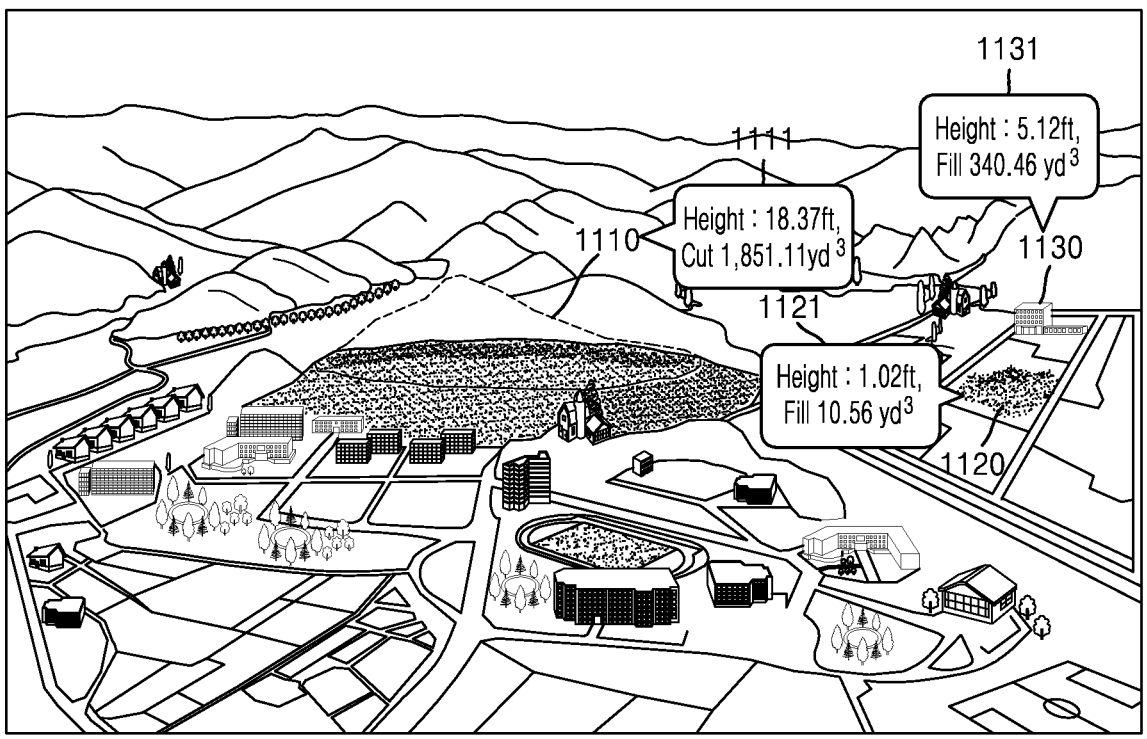

As an exemplary aspect of the present disclosure, the DSM comparator 920 may display, as in FIG. 11, changes 1110, 1120, and 1130 between the reference image 700 shown in FIG. 7 and a second comparison image 720 taken at time t3. In addition, volume changes 1111, 1121, and 1131 may be converted to numerical values and the numerical values may be further displayed on the comparison image.

Figure 12:
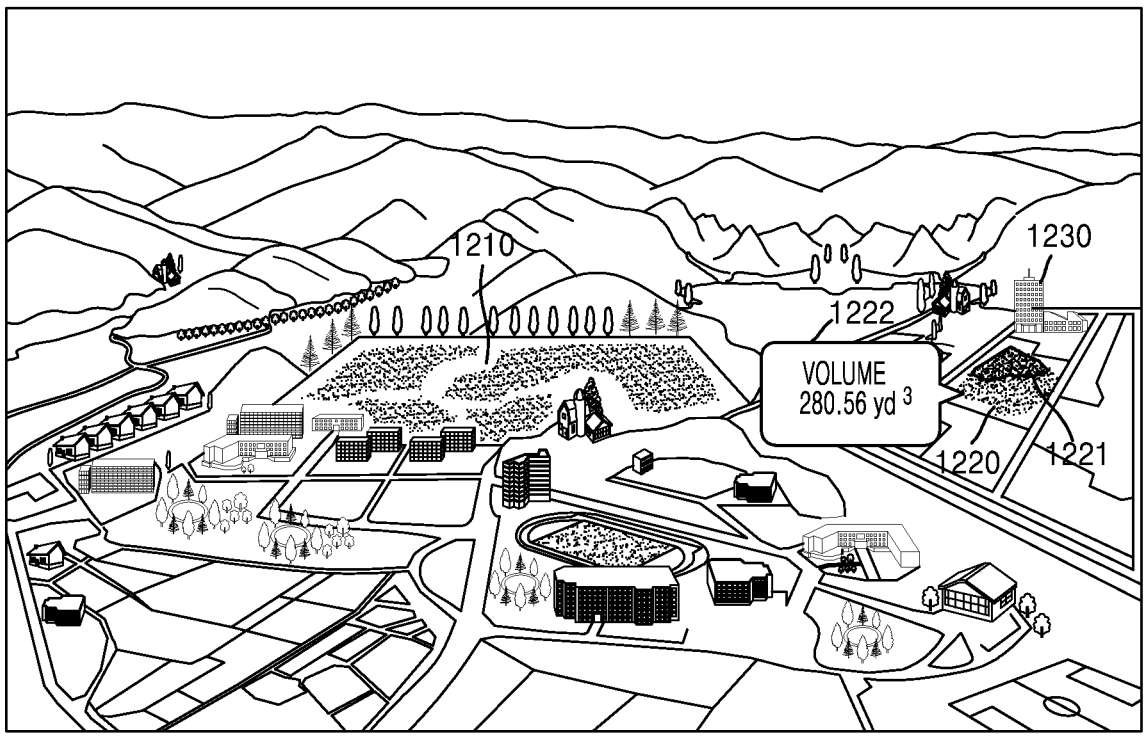

As an exemplary aspect of the present disclosure, the DSM comparator 920 may display, as in FIG. 12, changes 1210, 1220, and 1230 between the reference image 700 shown in FIG. 7 and a third comparison image 730 taken at time t4. In addition, when an area 1221 in which the amount of change is desired to be checked is set on some of the areas where the changes 1210, 1220, and 1230 have occurred, the volume of the set area may be displayed as a numerical value 1222. In another exemplary aspect of the present disclosure, the DSM comparator 120 may be implemented to take a comparison image in real time and check the amount of change between the comparison image and the reference image in real time.

The change display portion 930 may display, with color, shading, numerical values, and the like, an area in which a change has occurred between the reference image and the comparison image, based on a comparison result of the DSM comparator 920. The change display portion 930 may display some or all of areas in which changes have occurred between the reference image and at least one comparison image. As an exemplary aspect of the present disclosure, the change display portion 130 may compare a DSM of the reference image with a DSM of the comparison image and distinguish and display an area in which altitude is increased and an area in which altitude is decreased.

In addition, the change display portion 930 may compare the DSM of the reference image with the DSM of the comparison image and change a display method according to an increase range of altitude. As an example, shading may be displayed differently in units of 1 meter (m) and 1 foot (ft).

Figure 14:
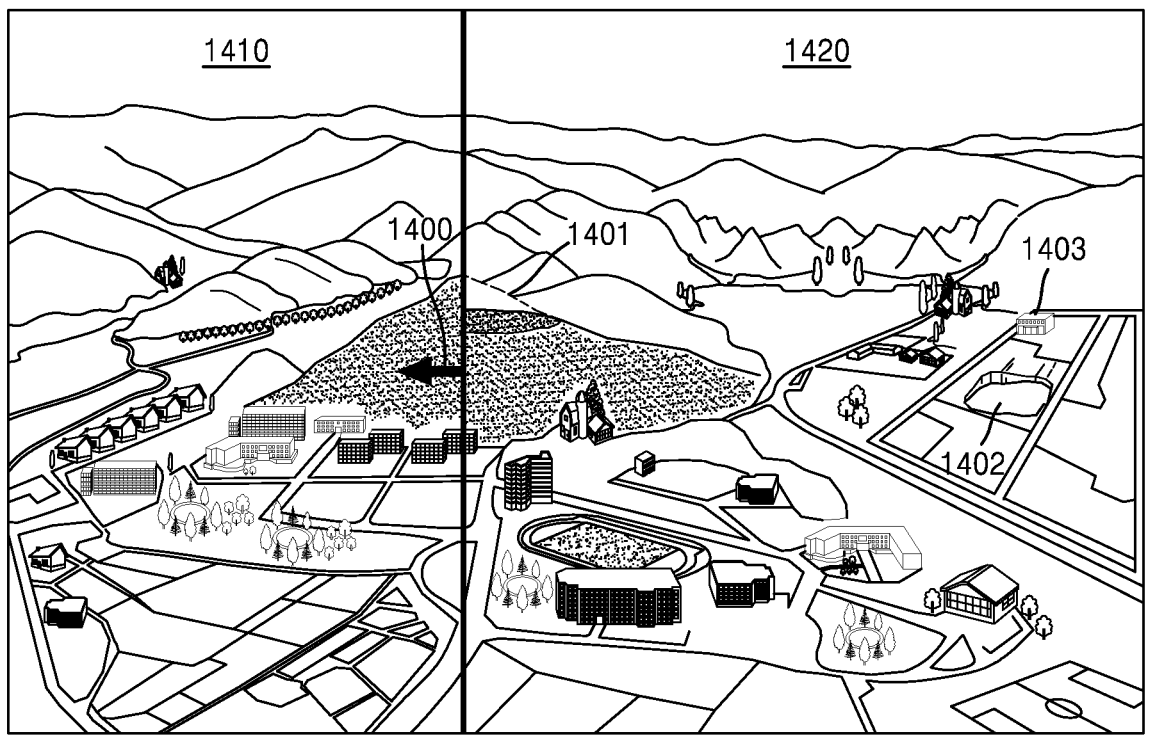

As an exemplary aspect of the present disclosure, the change display portion 930 may use various display methods. According to an aspect, the change display portion 930 may display a comparison image on a reference image so as to scroll over and overlap according to a first display method 932. Referring to FIG. 14, a reference image 1410 may be displayed below, and a part or the entirety of a comparison image 1420 may overlap and displayed on the reference image 1410 in the direction of a user's mouse movement and the user's input movement. The user may intuitively compare areas 1401, 1402, and 1403 where changes have occurred through an overlapped image according to the first display method 932.

As another exemplary aspect of the present disclosure, the change display portion 930 may display a reference image and at least one comparison image on one screen according to a second display method 934. In this case, the reference image and a part or the entirety of the at least one comparison image may be selected and displayed on one screen. Referring to FIG. 15, a screen may be divided into four sub-screens to display a reference image 1511 on one sub-screen and first to third comparison images 1512, 1513, and 1514 on the other sub-screens. In this case, each of the four sub-screens, that is, first to fourth sub-screens 1510, 1520, 1530, and 1540, may support an interface 1550 for selecting any image from the reference image 1511 and the first to third comparison images 1512, 1513, and 1514. The interface 1550 is supported to select a desired image.

As an exemplary aspect of the present disclosure, FIG. 15 shows an example in which, by using the interface 1550, the reference image 1511 is selected for the first sub-screen 1510, the first comparison image 1512 is selected for the second sub-screen 1520, the second comparison image 1513 is selected for the third sub-screen 1530, and the third comparison image 1514 is selected for the fourth sub-screen 1540.

As another aspect, when there are a plurality of sub-screens, the plurality of screens may be aligned by sorting in chronological order. In the exemplary aspect, time is designated as the criteria of alignment, but it should be noted that various modifications are possible. For example, a change in volume may be designated as the criteria of alignment.

As an exemplary aspect of the present disclosure, the terrain change amount visualization device 900 may further include a volume change display portion 940.

As an exemplary aspect of the present disclosure, a user may set, by using an interface, an area, in which a change in volume is desired to be known, on a result image obtained by comparing a reference image with a comparison image in the change display portion 930.

Figure 13:
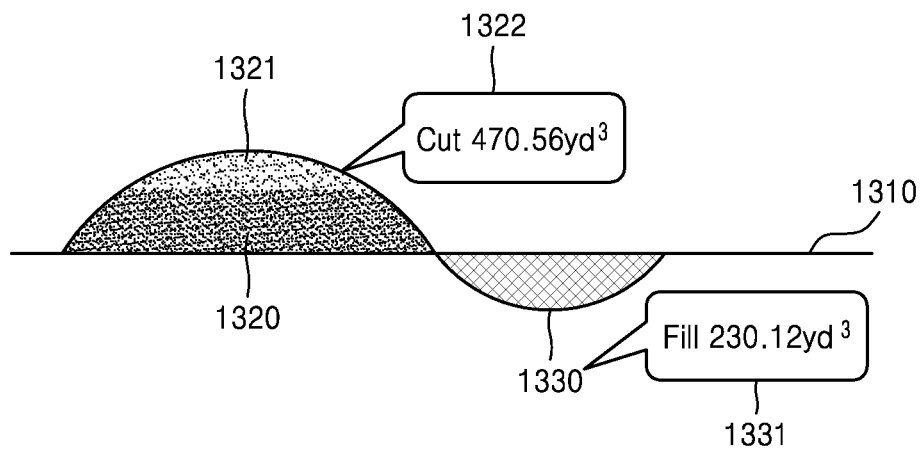

As another exemplary aspect of the present disclosure, a user may set, by using an interface, a desired area on a comparison image or an image where a reference image and a comparison image partially or completely overlap each other, or may display a reference line 1310 on the comparison image or the image as in the embodiment of FIG. 13.

The volume change display portion 940 may display, as a numerical value, a change in volume of a desired area input by a user. For example, by comparing a DSM altitude of a reference image to a DSM altitude of a comparison image included in a desired area input by a user, the volume increase and decrease of the desired area is calculated.

As an exemplary aspect of the present disclosure, a feature point A of a reference image taken on Mar. 20, 2017 and a feature point A' in a comparison image taken on Mar. 30, 2017, the feature point A' corresponding to the feature point A, have the same x and y coordinates, and thus, the volume change display portion 940 calculates an altitude difference between the feature point A and the feature point A'. For example, when an altitude value Z1 of the feature point A is 21.43 m and an altitude value Z1' of the feature point A' is 30.43 m, a difference ($\Delta Z = Z1' - Z1$) between the altitude value Z1 and the altitude value Z1' is 7 m.

The volume change display portion 940 may detect a change in volume by obtaining an altitude difference, as described above, in all coordinates within the surface area of an area where a change in volume is desired to be checked and then integrating the altitude difference.

The volume change display portion 940 may display the case where the volume is increased and the case where the volume is decreased, in different colors. In addition, colors and shades may be displayed differently according to the amount of increase in the volume and the amount of decrease in the volume. In addition, the volume calculated on the desired area input by the user may be displayed as a numerical value.

When a portion of an area where a change is displayed by the change display portion 930 is set and a user inputs a reference line, by using an interface, within the set portion of the area, the volume change display portion 940 may discriminatively display a portion exceeding the reference line (i.e., the reference line 1310 in FIG. 13) and a portion not exceeding the reference line within the set portion of the area.

In an exemplary aspect of the present disclosure, at a construction site or the like, the reference line may be used to reduce the amount of earthwork in a portion exceeding the reference line and increase the amount of earthwork in a portion not exceeding the reference line. In addition, by checking a volume from the reference line to the altitude of a DSM or contour line displayed on an image, it is possible to visually check how much the volume has to be cut and filled.

Referring to FIG. 13, when a user inputs a straight line-shaped reference line (i.e., the reference line 1310), an area 1320 exceeding the reference line 1320 and an area 1330 that does not reach the reference line 1320 may be discriminatively displayed, and also volume information 1321 of the area 1320 exceeding the reference line 1320 and volume information 1331 of the area 1330 that does not reach the reference line 1320 may be displayed together or separately.

As an exemplary aspect of the present disclosure, the volume change display portion 1340 calculates a change in volume between a reference image and a comparison image for a desired area input by a user through an interface. To this end, a DSM altitude difference between the reference image and the comparison image is calculated based on the surface area of the reference image, and the volume is calculated by integrating the calculated DSM altitude difference. It should be noted that this corresponds only to an aspect of the present disclosure and a change in volume may be calculated through various modifications.

The method in the present disclosure may also be embodied as computer-readable code on a computer-readable recording medium. The computer-readable recording medium may be any data storage device that may store data that may be thereafter read by a computer system.

Examples of the computer-readable recording medium may include read-only memories (ROMs), random-access memories (RAMs), compact disk read-only memories (CD-ROMs), magnetic tapes, floppy disks, and optical data storage devices. The computer-readable recording medium may also be distributed over network-coupled computer systems so that the computer-readable code may be stored and executed in a distributed fashion.

Example aspects have been described above with reference to the drawings. It will be understood by those of ordinary skill in the art that various changes in form and details may be made therein without departing from the spirit and scope of the inventive concept.

Therefore, it should be understood that aspects described herein should be considered in a descriptive sense only and not for purposes of limitation. While one or more aspects have been described with reference to the figures, it will be understood by those of ordinary skill in the art that various changes in form and details may be made therein without departing from the spirit and scope of the disclosure as defined by the following claims.

What is claimed is:

1. A method of providing drone data by matching a user with a provider, the method comprising:
   providing the user with an interface for designating a desired area on a map;
   setting at least one flight path within a designated area divided by the user into n zones (where n is a natural number);
   providing at least one provider with an interface for selecting the at least one of the n zones after checking the user's requirements set for each zone;
   receiving, from the at least one provider, drone data obtained by taking aerial images on a flight path selected by each of the at least one provider; and
   collecting the drone data received from the at least one provider and producing an integrated drone data map for the designated area
   wherein the interface receives, from the at least one provider, a flying time of a drone the at least one provider owns, a flying distance of the drone, and at least one of an angle of view, a pixel, and an altitude of an image shooting device used in the drone, the interface selectively activating zones capable of meeting the user's requirements, based on information received from the at least one provider, and providing the selectively activated zones to the at least one provider, wherein the at least one provider selects at least one of the selectively activated zones.

2. The method of claim 1, wherein the producing the integrated drone data map comprises checking whether an image of the drone data collected from the at least one provider for each flight path satisfies a criterion suitable for providing to the user and further checking whether the collected drone data meets the user's requirements, to thereby provide compensation to the provider when the image of the drone data satisfies the criterion and the collected drone data meets the user's requirements.

3. The method of claim 1, further comprising charging the user a fee for the integrated drone data map produced for the designated area.

4. An apparatus for providing drone data by matching a user with a provider, the apparatus comprising:
   a user interface portion that supports an interface in which a user designates a desired area on a map;
   a flight path setting portion that divides an area designated by the user into n zones (where n is a natural number);
   a provider interface that supports an interface for selecting at least one of the n zones after checking the user's requirements set for each zone;
   a drone data receiver that receives, from each of at least one provider, drone data obtained by shooting at least one zone selected by the at least one provider;
   an integrated drone data map maker that integrates the received drone data to produce an integrated drone data map for the area designated by the user;
   a provider compensator that checks whether the drone data received from each of the at least one provider meets the user's requirements, and then provides compensation to the at least one provider that provides drone data meeting the user's requirements; and
   a payment portion that provides the integrated drone data map to the user and requests payment;
   wherein the provider interface receives, from the at least one provider, a flying time of a drone the at least one provider owns, a flying distance of the drone, and at least one of an angle of view, a pixel, and an altitude of an image shooting device used in the drone, and selectively activates zones capable of meeting the user's requirements, based on information received from the at least one provider, and provides the selectively activated zones to the at least one provider, wherein the at least one provider selects at least one of the selectively activated zones.

5. The apparatus of claim 4, wherein the user sets at least one desired area on the map by using the user interface portion and sets a date, at which drone image is to be taken, and a resolution.

* * * * *